United States Patent [19]
Sauter et al.

[11] Patent Number: 5,465,749
[45] Date of Patent: Nov. 14, 1995

[54] TOP MOUNTING FAUCET ASSEMBLY

[75] Inventors: Bruce M. Sauter, Elgin; Kevin G. Short, Modlothian; Peter P. Beltemacchi, Chicago, all of Ill.

[73] Assignee: Sterling Plumbing Group, Inc., Rolling Meadows, Ill.

[21] Appl. No.: 348,634

[22] Filed: Dec. 2, 1994

[51] Int. Cl.$^6$ ..................................................... F16L 5/00
[52] U.S. Cl. .......................... 137/359; 137/315; 137/801; 4/675; 4/696; 4/DIG. 9
[58] Field of Search ......................... 4/675, 696, DIG. 9; 137/315, 359, 801

[56] References Cited

U.S. PATENT DOCUMENTS

| | | | |
|---|---|---|---|
| 2,365,372 | 12/1944 | Allen | 45/137 |
| 3,010,474 | 11/1961 | Moen | 137/359 |
| 3,014,563 | 12/1961 | Bratton | 189/36 |
| 3,348,444 | 10/1967 | Brignola | 85/70 |
| 3,449,774 | 6/1969 | Whilham | 4/240 |
| 3,489,312 | 1/1970 | Hunckler et al. | 220/24.5 |
| 3,785,396 | 1/1974 | Morris et al. | 137/359 |
| 3,790,966 | 2/1974 | Keane | 4/192 |
| 3,880,041 | 4/1975 | Markowski et al. | 85/70 |
| 4,080,671 | 3/1978 | Stahli | 4/236 |
| 4,553,277 | 11/1985 | Duncan | 4/643 |
| 4,654,900 | 4/1987 | McGhee | 4/191 |
| 4,671,316 | 6/1987 | Botnick | 137/359 |
| 4,704,057 | 11/1987 | McSherry | 411/55 |
| 4,760,861 | 8/1988 | Botnick | 137/315 |
| 4,762,143 | 8/1988 | Botnick | 137/315 |
| 4,852,192 | 8/1989 | Viegener | 4/191 |
| 4,998,555 | 3/1991 | Barhydt, Sr. et al. | 137/801 |
| 5,051,636 | 9/1991 | Ishimoto et al. | 310/90 |
| 5,127,427 | 7/1992 | Kajpust et al. | 137/216 |
| 5,232,008 | 8/1993 | Jeffress et al. | 137/15 |
| 5,388,287 | 2/1995 | Tischler et al. | 4/678 |

*Primary Examiner*—A. Michael Chambers
*Attorney, Agent, or Firm*—Quarles & Brady

[57] ABSTRACT

A top mounted valve assembly having a block member with a hinged arm which is fitted through from the top of a supporting surface and actuated by a threaded actuating member. As the actuating member is turned in one direction, the hinged arm engages the underside of the supporting surface. To disengage the faucet, the actuating member is turned in the opposite direction which permits removal. Both single and dual handle faucets can be top mounted by the mounting assembly disclosed herein. An aesthetically appearing faucet results wherein the actuating mechanism is hidden.

14 Claims, 8 Drawing Sheets

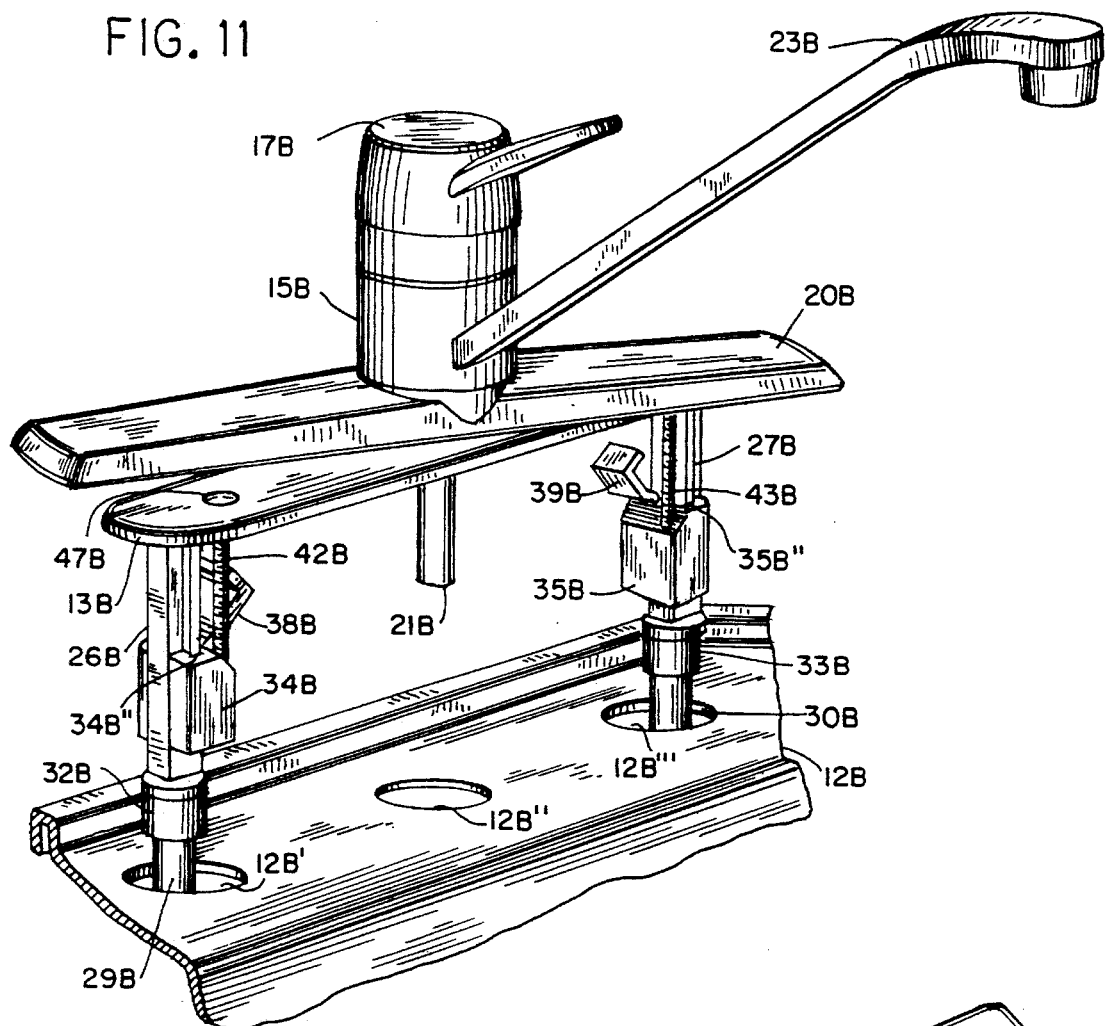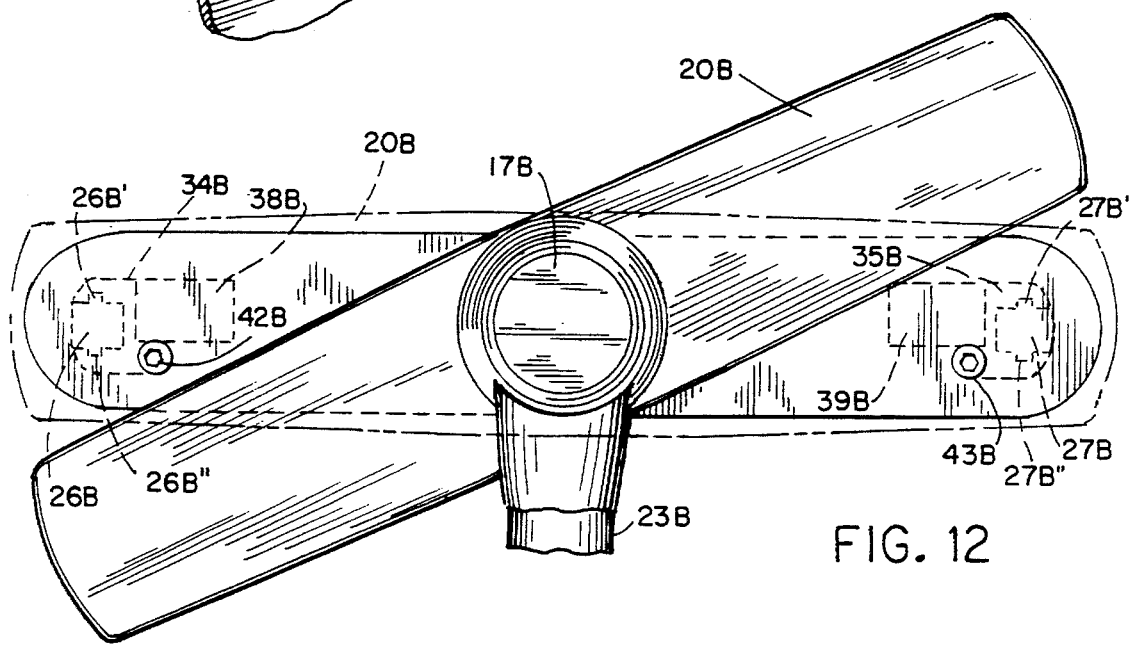

TOP MOUNTING FAUCET ASSEMBLY

BACKGROUND OF THE INVENTION

A. Field of the Invention

This invention relates to the mounting of valves to a plumbing fixture and more particularly to the mounting of the faucets from the top of the fixture.

B. Description of the Prior Art

The installation of a faucet into a plumbing fixture has often been a time consuming task requiring that at least some of the work be performed by lying on one's back in a dark and hard to reach under-counter area. There is a need to improve this task such as by providing a less complicated procedure which can in large part be effected from the top of the plumbing fixture.

In U.S. Pat. No. 4,553,277 a faucet and clamping mechanism is disclosed which provides a top side connection. However, it involves a multicomponent assembly. In U.S. Pat. Nos. 3,790,966, 4,671,316, 4,760,861, 4,762,143 and 5,127,427 toggle bolts or bushings are described for top installations of faucets. These require, among other things, the drilling of additional holes through a support surface.

U.S. Pat. No. 5,232,008 also illustrates a top mounted faucet. However, the valve bodies must be first inserted from beneath the sink deck. Thus, a need still exists for a simplified assembly.

SUMMARY OF THE INVENTION

In one form, the invention provides a valve assembly for mounting on a support having a wall with an opening, a supporting surface at one side, and a clamping surface at an opposite side. An elevator has at least one pivot arm adapted to be extended and retracted. The elevator is adapted to be inserted through the opening in the support when the pivot arm is in a retracted position. A valve body is adapted to be positioned on the supporting surface. A threaded actuating member extends through a portion of the valve body and also threadably engages the elevator. A guide member is connected to the valve body and extends through the support wall such that the elevator is operatively connected to the guide member. Rotation of the threaded actuating member effects movement of the elevator toward the clamping surface and engagement of the hinged arm in an extended and blocking position that can restrict movement of the elevator through the supporting surface.

In one preferred form, the guide member is a water inlet shank and the elevator has two pivot arms.

In another preferred form, the guide member is a post member extending from the valve body, and there are two hinged arms extending from a single elevator.

In one aspect, the elevator, the threaded actuating member and the guide member are constructed and arranged to permit disengagement of the elevator from the threaded actuating member.

In another aspect, the valve assembly includes a faucet body member mounted on a lavatory or sink ledge.

In still another aspect, a pivotal escutcheon is mounted over the faucet body member.

In yet another aspect, the valve assembly includes an elevator having at least one pivot arm, the elevator adapted to be inserted through the opening when the pivot arm is in a retracted position. A valve body is adapted to be positioned on the supporting surface, and a threaded actuating member extends through a portion of the valve body and also threadably engages the elevator. A spring means biases the pivot arm towards an unretracted position. Rotation of the threaded actuating member can effect movement of the elevator toward the clamping surface where an unretracted pivot arm can restrict movement of the elevator through the supporting surface.

The objects of the invention therefore include:

a. providing a valve assembly of the above kind for mounting most of the components from the top of a support surface;

b. providing a valve assembly of the above kind which enables quick, yet secure, assembly;

c. providing a valve assembly of the above kind which employs a small number of parts and is inexpensive to produce; and d. providing a valve assembly of the above kind which is suited to either single or dual handle faucet installations.

The foregoing and other objects and advantages of the invention will appear in the following detailed description. In the description, reference is made to the accompanying drawings which show, by way of illustration and not limitation, preferred embodiments of the invention.

DESCRIPTION OF THE DRAWINGS

FIG. 2 is an exploded view of the valve assembly shown in FIG. 1;

FIG. 10 is a sectional view taken along line 10—10 of FIG. 7;

FIG. 11 is a view similar to FIG. 2 showing a third embodiment;

FIG. 12 is a top plan view of the embodiment shown in FIG. 11, but with an escutcheon pivoted in a counterclockwise manner.

DESCRIPTION OF THE PREFERRED EMBODIMENT

Figure 1:
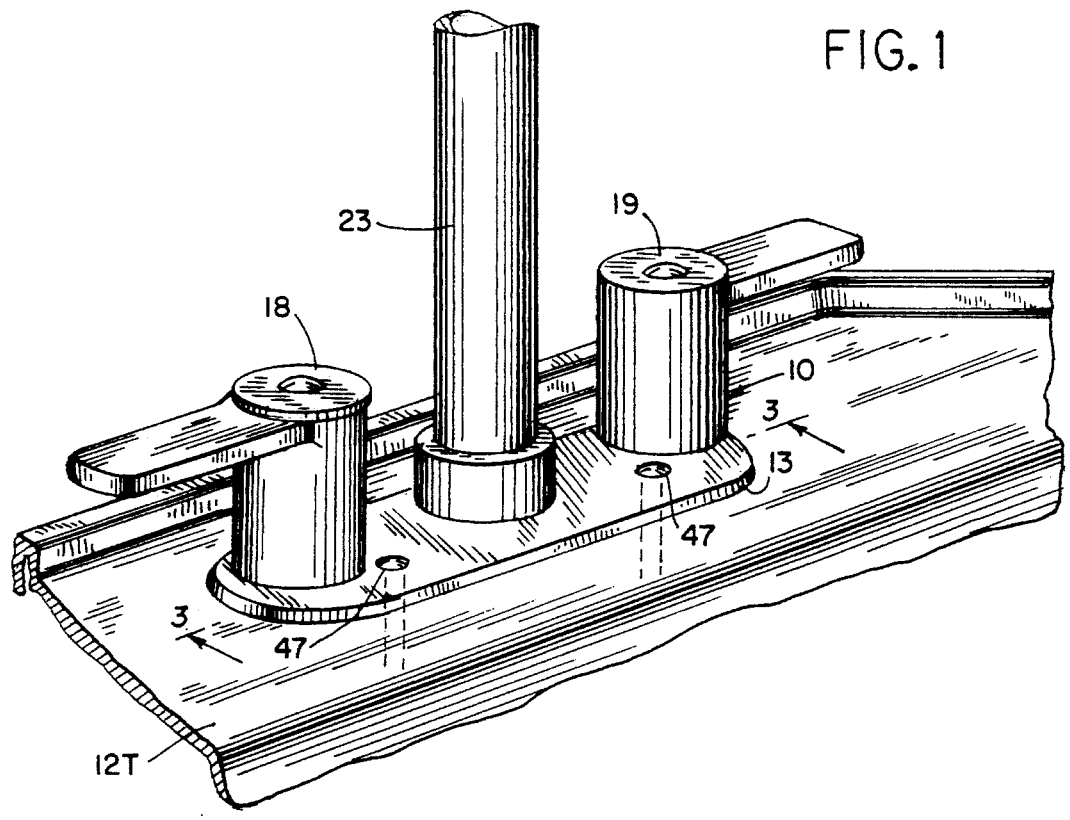
FIG. 1 is a front, top perspective view showing one embodiment of the valve assembly mounted on a sink ledge support which is partially shown.
Figure 3:
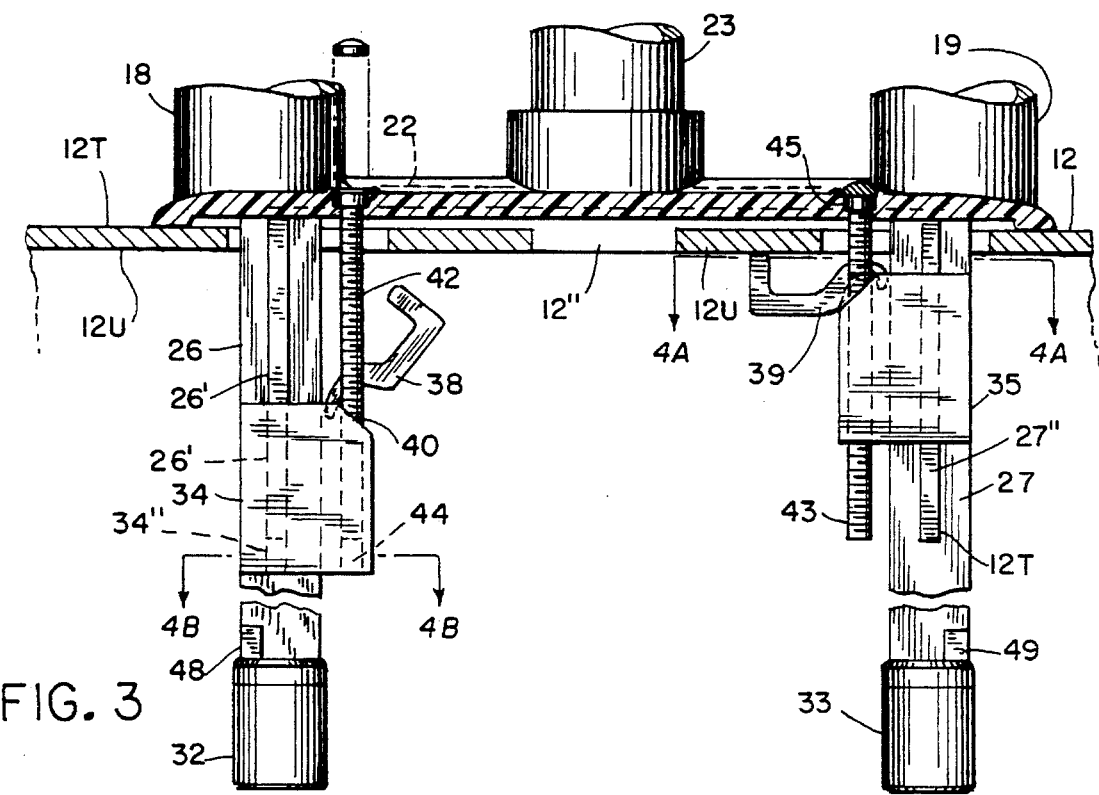
FIG. 3 is a partial sectional view taken along line 3—3 of FIG. 1.

Referring to FIGS. 1–3, a top mounting valve assembly (generally 10) is shown in conjunction with a sink ledge 12 having the usual access openings 12', 12", 12'". The valve assembly 10 includes a plastic molded valve body or manifold 13 for delivery of water from valve housings 15 and to a central spout 23 such as through passageway 22. Water is supplied to the manifold 13 by means of the water inlet shanks 26 and 27 which are in turn connected to respective hot and cold inlet conduits 29 and 30 by the respective couplings 32 and 33.

To mount the valve assembly 10 onto the sink ledge 12, inlet conduits 29 and 30 would first be connected to the water inlet shanks 26 and 27. The inlet conduits 29 and 30 are orientated and positioned to be placed through the sink ledge openings 12' and 12'" as indicated in FIG. 2. The valve assembly 10 is lowered until the manifold 13 contacts the upper surface 12T of the sink ledge 12. Molded plastic block elevator members 34 and 35 which are slidably secured to the water inlet shanks 26 and 27 also pass through the openings 12' and 12'". The plastic hinged arms 38 and 39 also pass through openings 12' and 12'" as they are hinged to the block members 34 and 35 by respective plastic living hinges 40 and 41.

Figure 4:
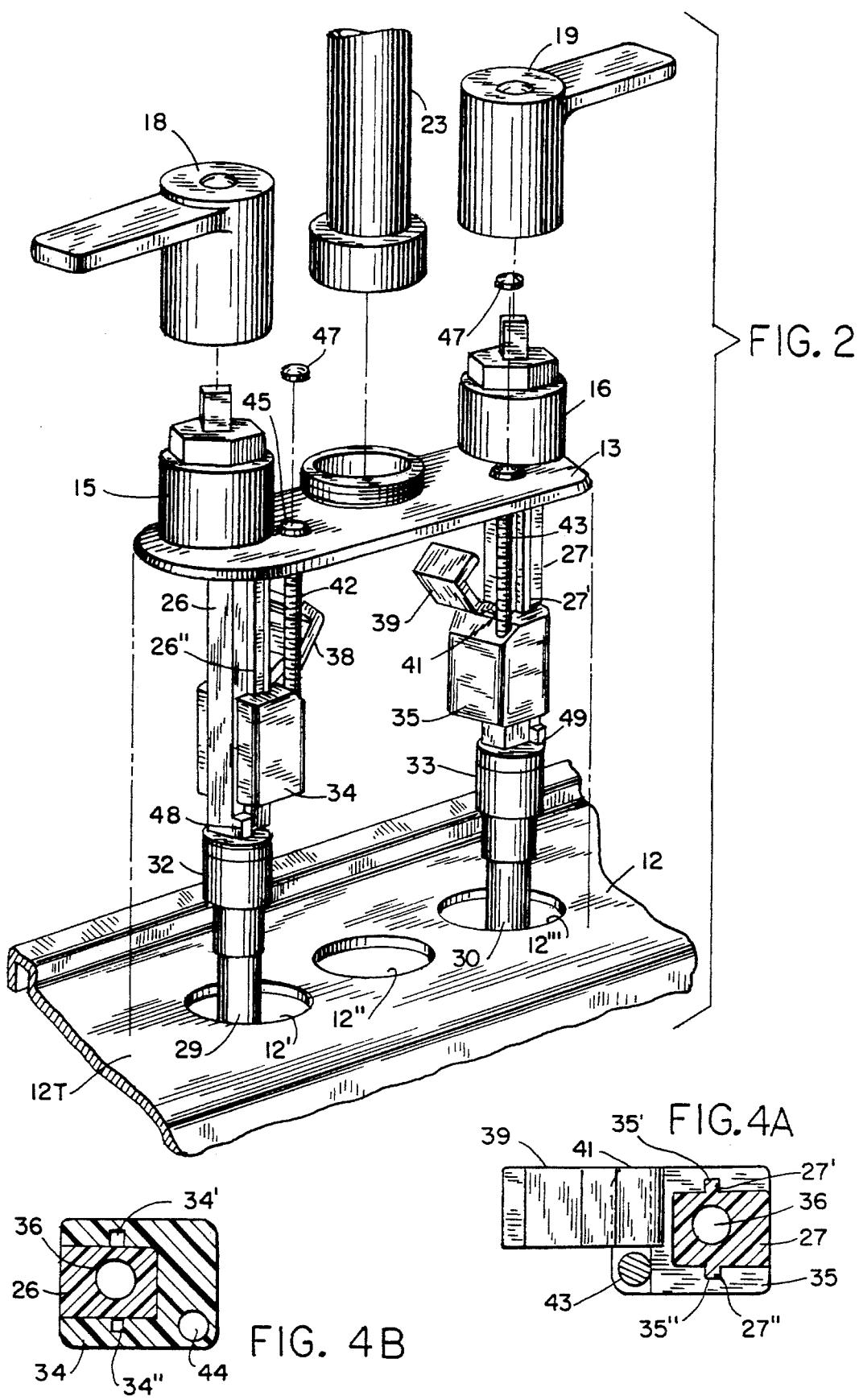
FIG. 4A is a sectional view taken along line 4A—4A of FIG. 3.
FIG. 4B is a sectional view taken along line 4B—4B of FIG. 3.
Figure 5:
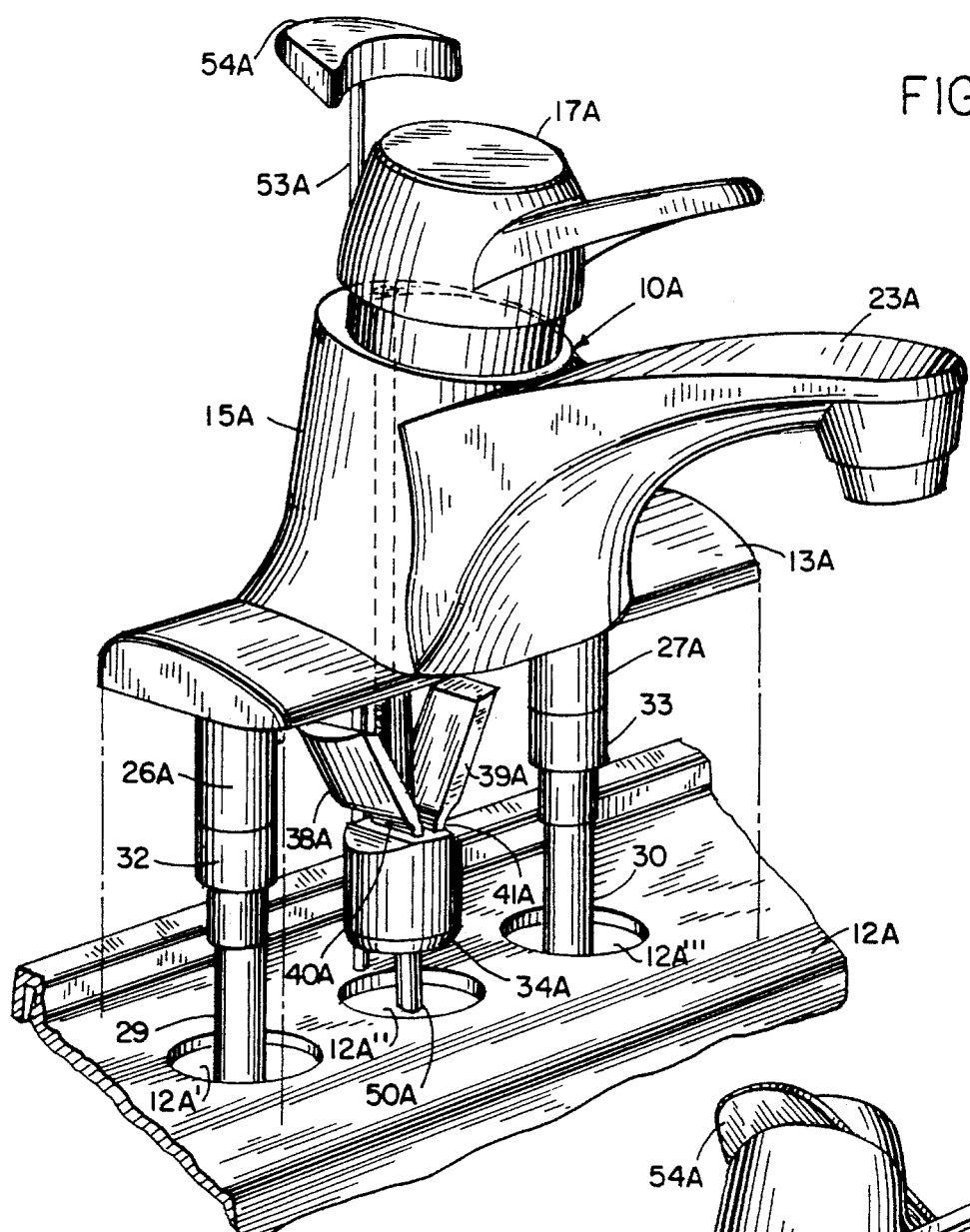
FIG. 5 is a front, top perspective view of a second embodiment of the valve assembly shown prior to connection to a lavatory ledge support.
Figure 6:
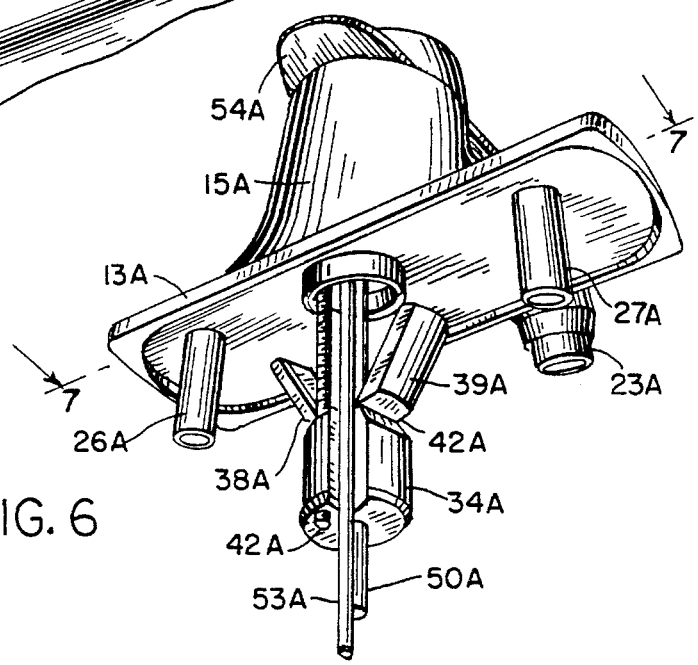
FIG. 6 is a bottom perspective view of the valve assembly shown in FIG. 5.
Figure 7:
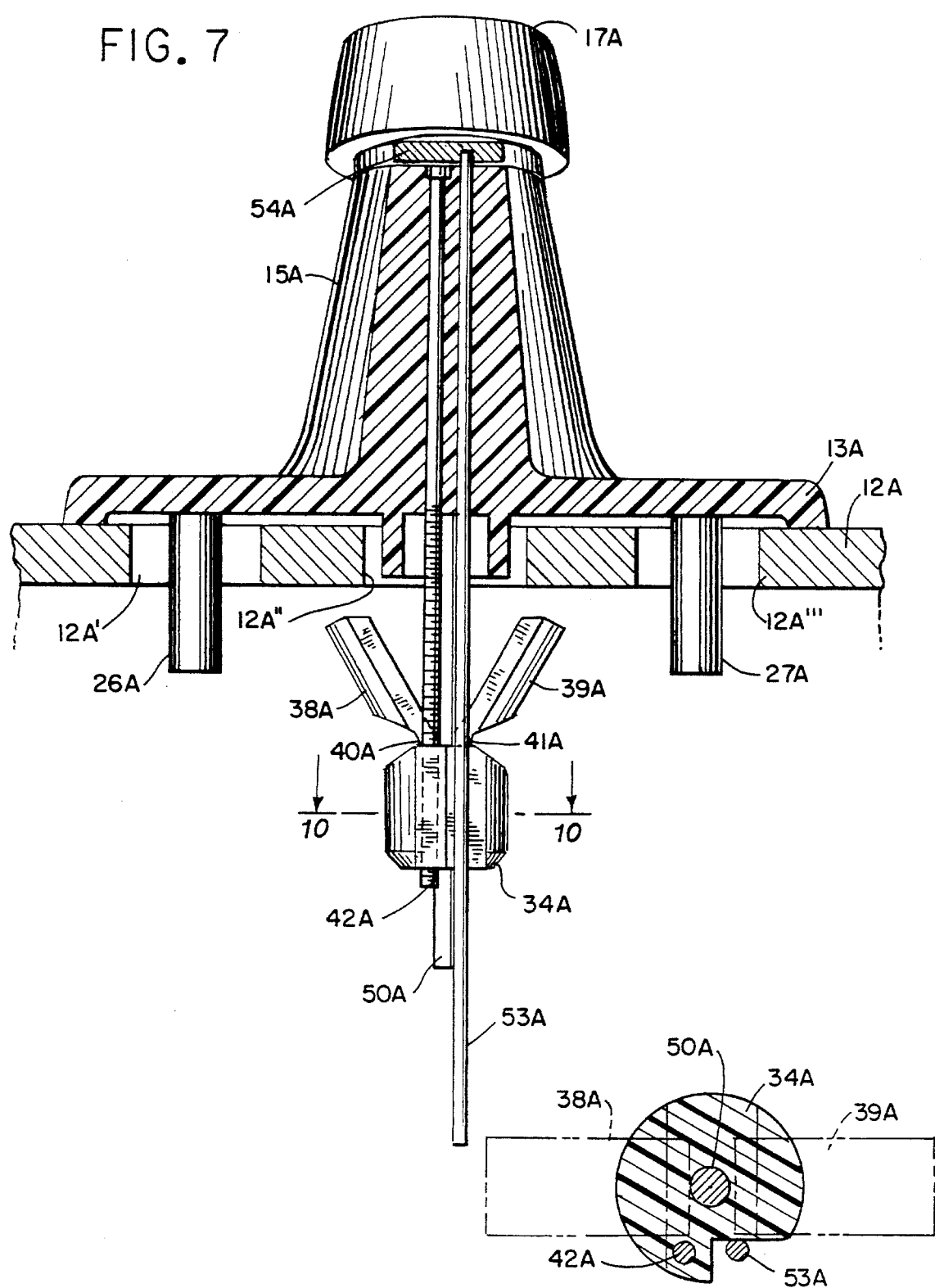
FIG. 7 is a partial sectional view taken along line 7—7 of FIG. 6 with the valve inserted in the wall 12A.
Figure 8:
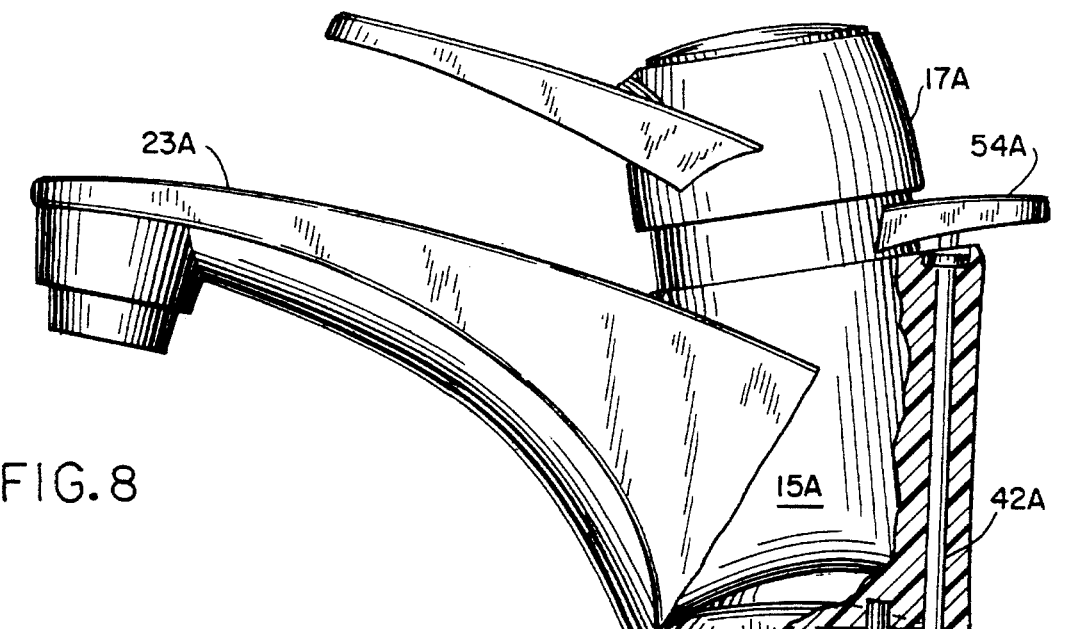
FIG. 8 is a view in side elevation (with partial section) showing the valve assembly of FIGS. 5–7 connected to a lavatory ledge support.
Figure 9:
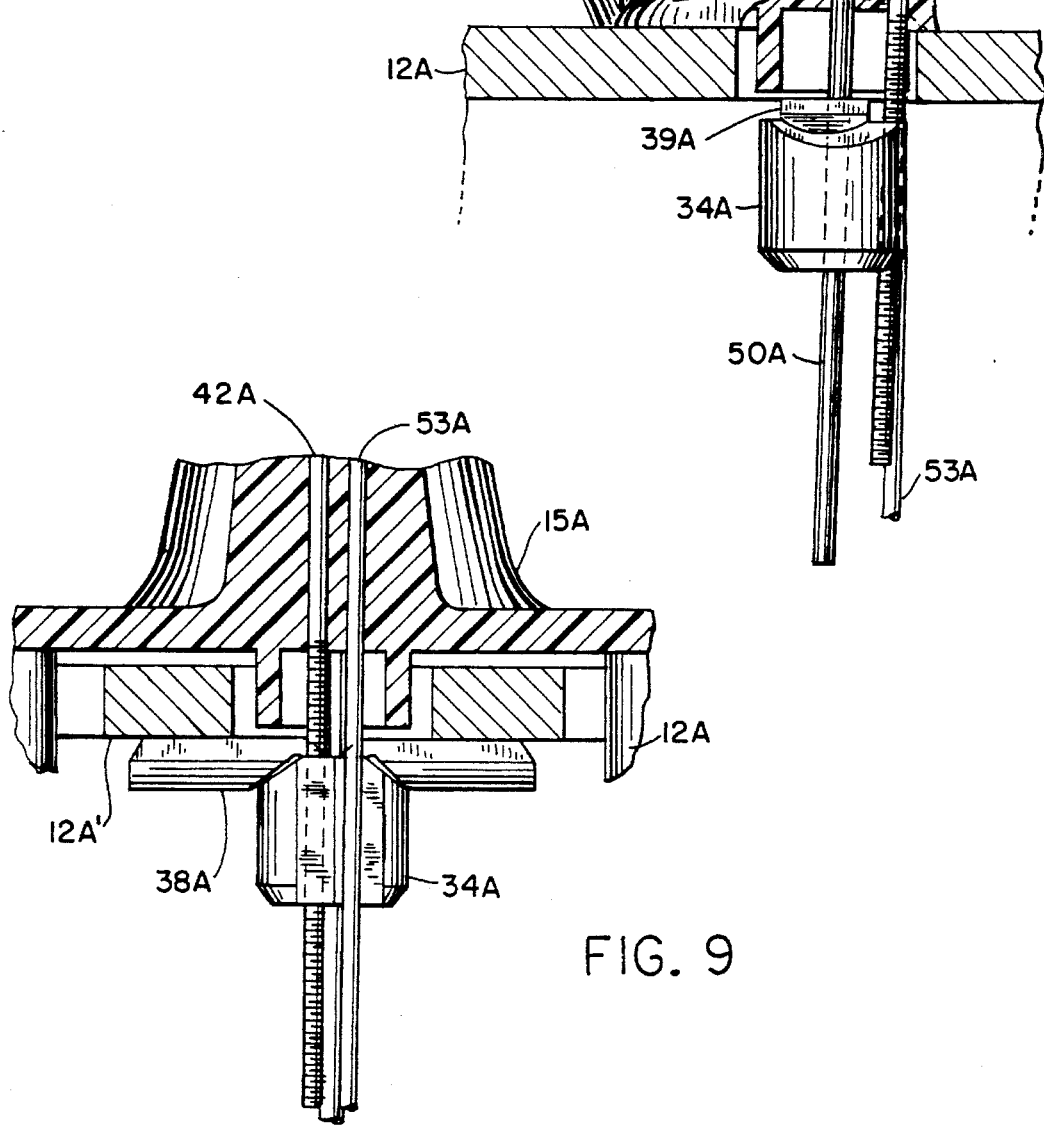
FIG. 9 is an enlarged, partial view of the valve assembly shown in FIG. 8 but at 90° thereto.

Once the manifold 13 is resting on the sink ledge 12, the screws 42 and 43 are rotated such as by a screwdriver through the screw holes 45 at the top of the manifold 13. Rotation of the screws 42 and 43 in the screw holes of the block members 34 and 35 (such as 44 shown in FIG. 4B) causes the slidable block members 34 and 35 to ride upwardly on the respective water inlet shanks 26 and 27. Guidance is provided by the rib surfaces such as 27' and 27" of shank 27 engaged in the grooves 35' and 35" of block member 35, as well as rib surface 26" of shank 26 in groove 34". An opposing rib surface on shank 26 as shown at 26B' in FIG. 12 engages groove 34'. This engagement is best seen in FIG. 4A, as well as the inlet water passage 36 in the shank 27.

The hinge arms 38 and 39 ultimately engage the underside surface 12U of the sink ledge 12 where they pivot downwardly and extend over the sink surface 12U to effect a locking engagement. This is seen on the right hand side in FIG. 3. Once secured in place, the screw holes 45 can be covered with screw caps 47 for decorative purposes.

To remove the valve assembly 10 from the sink ledge 12, screws 42 and 43 are turned in a reverse manner thus moving the block members 34 and 35 away from the underside 12U of the sink ledge 12. For ease of disassembly, once the block members 34 and 35 reach the end of the screws 42 and 43 they are constructed to drop off of them as well as the water inlet shanks 26 and 27. This is effected by discontinuing the ribs 26' and 27', 27", such as shown by the tapered portion 27T in FIG. 3, a sufficient distance from the couplings 32 and 33 so as to permit the block members 34 and 35 to drop off. Deflector blocks 48 and 49 assist in this.

This drop off feature facilitates removal in case the hinge arms 38 and 39 do not fully retract so as to clear the openings 12' and 12'" when the valve assembly 10 is pulled upwardly and out of the sink ledge 12. The only work which need be done under the sink would be the connection and disconnection of the hot and cold inlet conduits 29 and 30 to the usual water supply pipes, and the movement of the conduits up through holes in the ledge 12.

Referring to the alternative embodiments (generally 10A, 10B, and 10C) as shown in FIGS. 5–18, the same or similar components are designated with the same reference numerals as for the first embodiment except followed by the letters "A" and "B". Referring first to embodiment 10A and FIGS. 5–10, it is seen that it differs from embodiment 10 in that it is a single handle faucet as shown at 17A with valve housing 15A for attachment to a lavatory fixture such as indicated by ledge 12A. It should be understood that manifold 13A will have a suitable passageway to convey water from the inlet shanks 26A and 27A to the valve housing 15A which contains the usual valve assembly. Another distinct difference is the fact that instead of the mounting block 34A being mounted on the water inlet shanks 26A or 27A, it is instead mounted on a separate centrally positioned guidepost 50A. A further difference is that the two hinged arms 38A and 39A are connected to a single block member 34A. A drain activating rod is shown at 53A. In all other material respects, the installation of, as well as the removal of, the valve assembly 10A is essentially the same as previously described for valve assembly 10.

A third embodiment 10B is shown in FIGS. 11 and 12. It has the attributes of valve assembly 10 in that it is employed with a sink ledge 12B and utilizes two block members 34B and 35B for slidable engagement over the water inlet shanks 26B and 27B. It differs from embodiment 10 in that embodiment 10A has a single handle faucet as shown at 17B. It is different from both of the preceding embodiments in that it incorporates a pivotal escutcheon 20B which pivots around valve body 15B and in one position allows access to the screws 42B and 43B such as from the top of the manifold 13B. As shown in FIG. 11, they are covered with removal caps 47B. Once the manifold 13B is secured in place, the pivotal escutcheon 20B would be orientated with the manifold 13B so as to completely cover it and be connected thereto by a frictional snapfit arrangement. As an optional feature, there is a shower spray hose 21B which extends from the valve housing 15B through the opening 12B".

Figure 15:
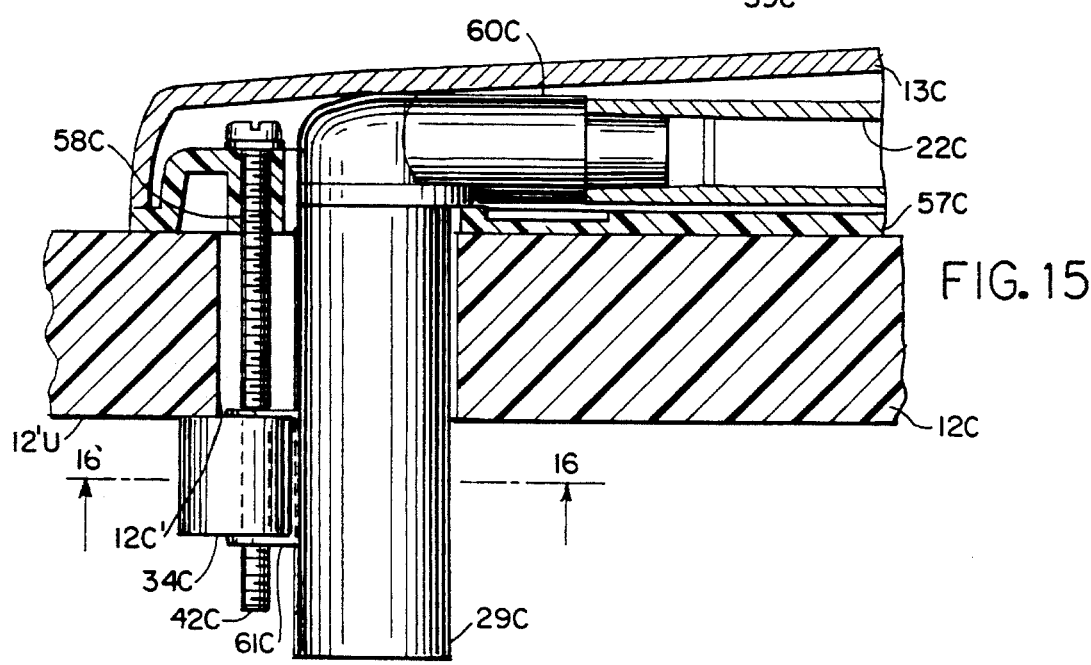
FIG. 15 is an assembly view similar to FIG. 13 but with the blocking member repositioned under the counter.
Figure 16:
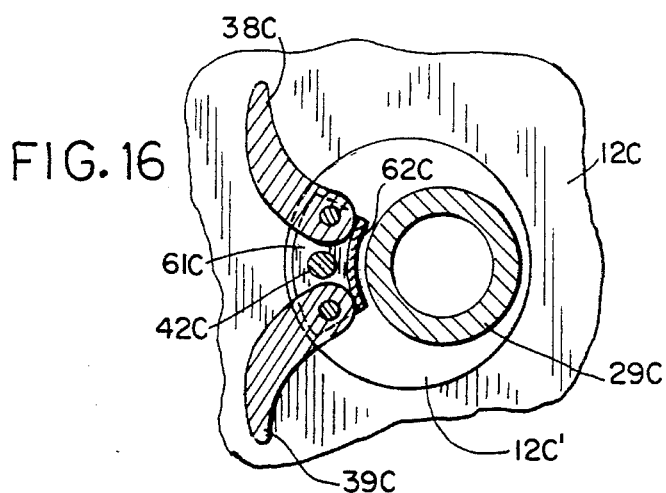
FIG. 16 is a sectional view taken along line 16—16 of FIG. 15.
Figure 17:
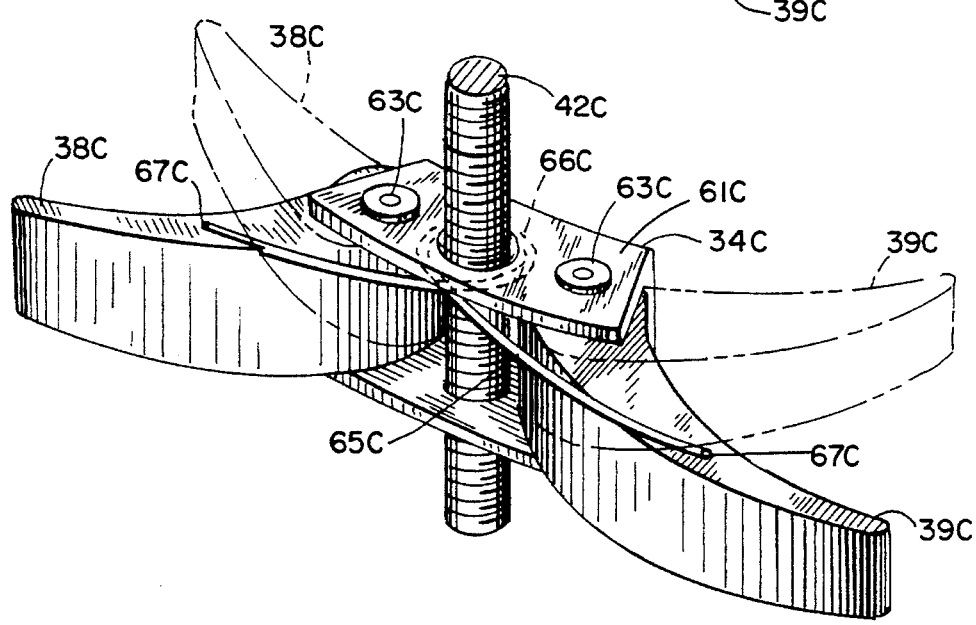
FIG. 17 is an enlarged perspective view illustrating the elevator of FIG. 13 with spring tensioned arms.
Figure 18:
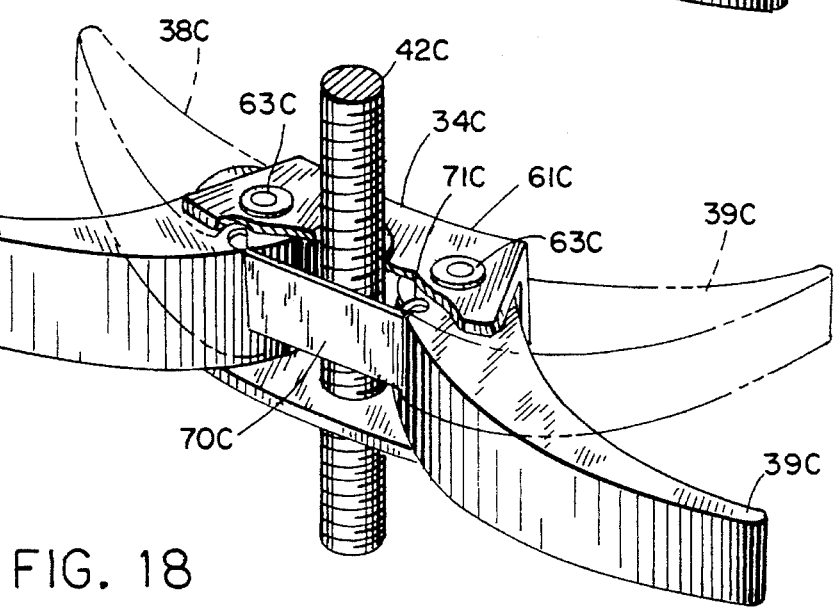
FIG. 18 is a view similar to FIG. 17 illustrating another embodiment of the elevator.

A fourth embodiment 10C is shown in FIGS. 13–18. It differs from the previous embodiments in the construction of the elevator 34C. Instead of the one piece hinged arms 38 and 39 which move upwardly and downwardly, it has the spring tensioned arms 38C and 39C which move laterally. Referring specifically to FIGS. 17 and 18, these arms are pivotally attached to the bracket 61C by the pivot pins 63C. A spring 65C has a center section 66C (as shown particularly in FIG. 17) which surrounds the screw 42C to which bracket 61C is threaded. The legs of the spring arms are mounted in the hinged arms 38C and 39C by the slots 67C.

A different type of spring arrangement is utilized in FIG. 18 wherein a band type spring 70C is employed and is mounted in the hinged arms 38C and 39C by the slots 71C.

Figure 13:
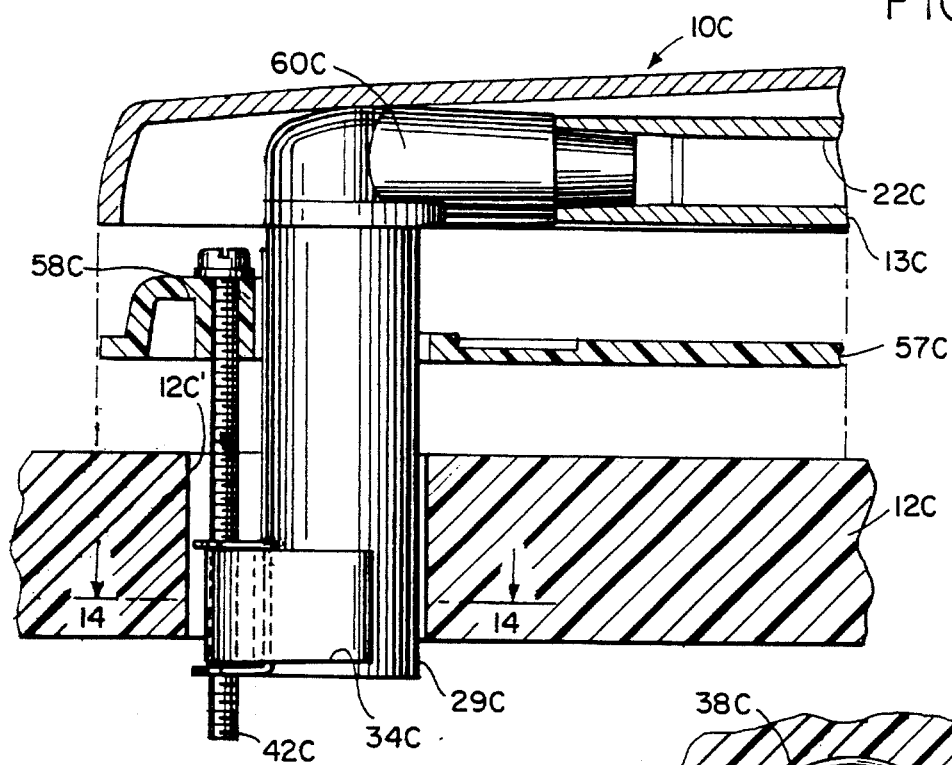
FIG. 13 is a partial sectional and exploded view of a fourth embodiment.
Figure 14:
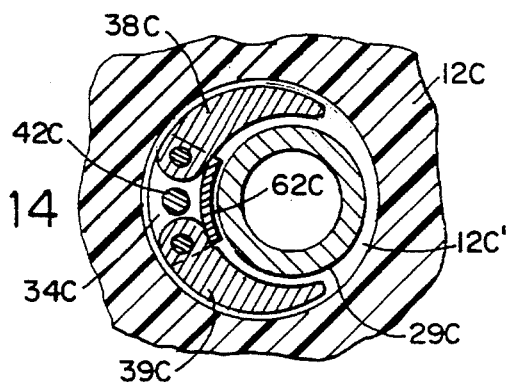
FIG. 14 is a sectional view taken along line 14—14 of FIG. 13.

The operation of this embodiment is essentially the same as described for the previous embodiments. The hinged arms 38C and 39C are collapsed around the hot water inlet 29C as shown in FIGS. 13 and 14. A separate bracket 57C carries the screw 42C through passage 58C for actuating movement of the elevator 34C. With the arms so collapsed, they can be passed through the opening 12'C and will be kept from expanding by the wall of the opening. After the arms clear the opening 12'C, they expand under the bias of springs 65C or 75C in the opposite direction as shown in FIGS. 15 and 16. The screw 42C is then activated to move the elevator 34C upwardly until the arms 38C and 39C engage under the lavatory 12C as shown at 12'U. The elevator 34C is guided upwardly by the bracket arcuate guide surface 62C engaging the conduit 29C. With elevator in the position shown in FIGS. 15 and 16, the manifold 13C is placed in the position shown in FIG. 15. There it will be seen that the hot water in the conduit 29C is connected to the passageway 22C by the connector 60C to deliver water to a spout such as shown at 23 in FIG. 1.

Disassembly of embodiment 10C is the same as described for embodiment 10 with the elevator member 34C dropping from screw 42C when it reaches the end of screw threads.

It will therefore be appreciated that a top mounted valve assembly can be achieved in a simple and secure manner by merely turning a screw from above the sink or lavatory fixture. A secure mounting is effected by hinged arms which can be passed through the same openings as the water inlet conduits. Thus, no additional holes need be made.

Still another feature of the valve assembly resides in the aesthetic feature of the mounting screws being covered either with caps and/or the pivotal escutcheon.

Yet another feature is the versatility of utilizing the hinged arms and the mounting block on either a single handle or dual handle faucet.

Thus, the invention provides an improved mounting for a valve assembly. While the preferred embodiments have been described above, it should be readily apparent to those skilled in the art that a number of modifications and changes may be made without departing from the spirit and scope of the invention. For example, while the valve assembly has been shown as part of a faucet attached to sink and lavatory plumbing fixtures, it is also adaptable for use with other types of fluid valves (e.g. a shower control valve on a wall). Also, the specific materials mentioned are not the only materials which can be used. All such and other modifications within the spirit of the invention are meant to be in the scope of the invention.

We claim:

1. A valve assembly for mounting on a support, the support having a wall with an opening, a supporting surface at one side, and a clamping surface at an opposite side, the valve assembly comprising:

a riding member having at least one pivot arm adapted to be extended and retracted, said riding member adapted to be inserted through said opening when said pivot arm is in a retracted position;

a valve body adapted to be positioned on said supporting surface;

a threaded actuating member extending through a portion of said valve body for actuation from a position on said supporting surface at said one side and also threadably engaging said riding member; and a guide member connected to said valve body and extendable through the support wall such that the riding member is operatively guided by said guide member;

whereby rotation of said threaded actuating member can effect movement of said riding member toward said clamping surface and engagement of said pivot arm in an extended and blocking position that can restrict movement of said riding member through the supporting surface.

2. The valve assembly of claim 1, wherein said guide member is a water inlet shank.

3. The valve assembly of claim 1, wherein said guide member is a post member extending from said valve body.

4. The valve assembly of claim 1, wherein said riding member and said threaded actuating member are constructed and arranged to permit disengagement of said riding member from said guide member by reverse rotation of said threaded actuating member.

5. The valve assembly of claim 4, wherein there is included a deflector member operatively connected to said guide member to assist in disengagement of said riding member.

6. The valve assembly of claim 1, wherein the valve body includes a faucet manifold member.

7. The valve assembly of claim 6, further including a pivotal escutcheon mounted over said faucet manifold member.

8. The valve assembly of claim 1, wherein there is a screw hole in said valve body to accommodate said threaded actuating member, said hole being covered by a cover cap.

9. The valve assembly of claim 1, wherein the support is a plumbing fixture ledge.

10. The valve assembly of claim 1, wherein said pivot arm is spring biased.

11. The valve assembly of claim 10, wherein there are two pivot arms.

12. The valve assembly of claim 1, wherein said pivot arm is hinged to said riding member.

13. The valve assembly of claim 12, wherein there are two hinged arms.

14. A valve assembly for mounting on a support, the support having a wall with an opening, a supporting surface at one side, and a clamping surface at an opposite side, the valve assembly comprising:

a riding member having at least one pivot arm, said riding member adapted to be inserted through said opening when said pivot arm is in a retracted position;

a valve body adapted to be positioned on said supporting surface;

a threaded actuating member extending through a portion of said valve body for actuation from a position on said supporting surface at said one side and also threadably engaging said riding member; and spring means biasing the pivot arm towards an unretracted position;

whereby rotation of said threaded actuating member can effect movement of said riding member toward said clamping surface where the unretracted pivot arm can restrict movement of said riding member through the supporting surface.

* * * * *

UNITED STATES PATENT AND TRADEMARK OFFICE
CERTIFICATE OF CORRECTION

PATENT NO. : 5,465,749
DATED : November 14, 1995
INVENTOR(S) : Bruce M. Sauter et al.

It is certified that error appears in the above-indentified patent and that said Letters Patent is hereby corrected as shown below:

On the title page:

[75] Inventors

After "Short" "Modlothian" should be --Midlothian--.

[56] References Cited
U.S. PATENT DOCUMENTS

After "3,449,774 6/1969" "Whilham" should be --Wilham--.

Column 3, line 8 after "Preferred" "Embodiment" should be --Embodiments--.

Column 3, line 15 before "to" --16-- should be inserted.

UNITED STATES PATENT AND TRADEMARK OFFICE
CERTIFICATE OF CORRECTION

PATENT NO. : 5,465,749

DATED : November 14, 1995

INVENTOR(S) : Bruce M. Sauter et al.

It is certified that error appears in the above-indentified patent and that said Letters Patent is hereby corrected as shown below:

Column 4, line 24 before "block" "single" should be underlined.

Signed and Sealed this

Nineteenth Day of March, 1996

*Attest:*

BRUCE LEHMAN

*Attesting Officer*     *Commissioner of Patents and Trademarks*

REEXAMINATION CERTIFICATE (3202nd)

United States Patent [19]

Sauter et al.

[11] B1 5,465,749

[45] Certificate Issued May 20, 1997

[54] TOP MOUNTING FAUCET ASSEMBLY

[75] Inventors: Bruce M. Sauter, Elgin; Kevin G. Short, Modlothian; Peter P. Beltemacchi, Chicago, all of Ill.

[73] Assignee: Sterling Plumbing Group, Inc., Rolling Meadows, Ill.

Reexamination Request:
No. 90/004,402, Oct. 1, 1996

Reexamination Certificate for:
Patent No.: 5,465,749
Issued: Nov. 14, 1995
Appl. No.: 348,634
Filed: Dec. 2, 1994

Certificate of Correction issued Mar. 19, 1996.

[51] Int. Cl.[6] .................................................. F16L 5/00
[52] U.S. Cl. ........................ 137/359; 137/315; 137/801; 4/675; 4/696; 4/DIG. 9
[58] Field of Search .................................... 137/315, 359, 137/801; 4/675, 696, DIG. 9

[56] References Cited

FOREIGN PATENT DOCUMENTS

| 0213656 | 3/1987 | European Pat. Off. . |
| 2525296 | 10/1983 | France . |

*Primary Examiner*—A. Michael Chambers

[57] ABSTRACT

A top mounted valve assembly having a block member with a hinged arm which is fitted through from the top of a supporting surface and actuated by a threaded actuating member. As the actuating member is turned in one direction, the hinged arm engages the underside of the supporting surface. To disengage the faucet, the actuating member is turned in the opposite direction which permits removal. Both single and dual handle faucets can be top mounted by the mounting assembly disclosed herein. An aesthetically appearing faucet results wherein the actuating mechanism is hidden.

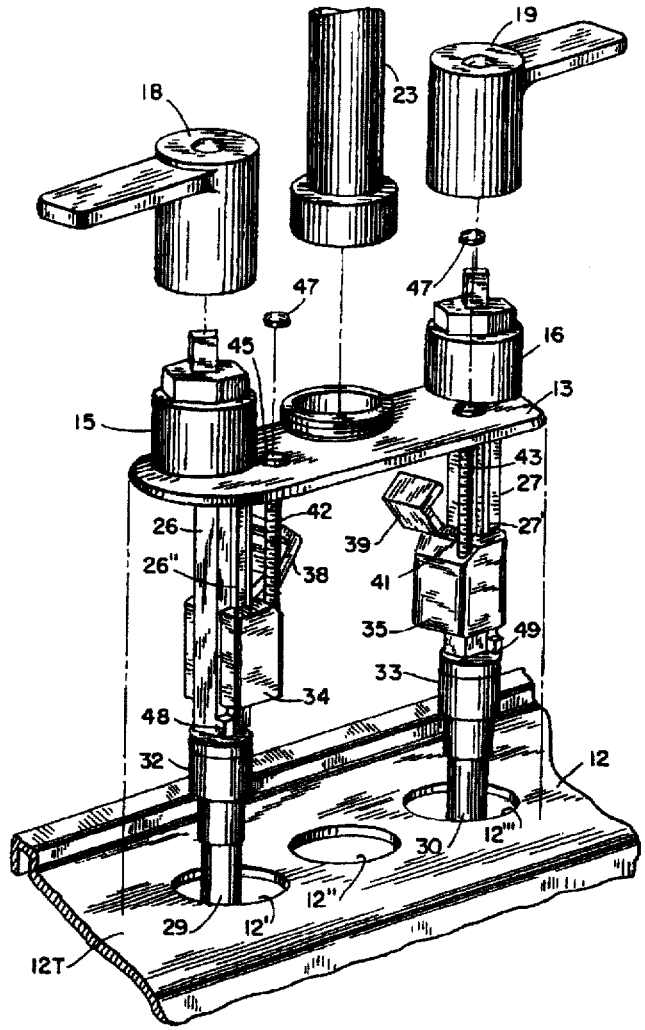

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 14 is confirmed.

Claim 4 is cancelled.

Claims 1 and 5 are determined to be patentable as amended.

Claims 2, 3 and 6–13, dependent on an amended claim, are determined to be patentable.

1. A valve assembly for mounting on a support, the support having a wall with an opening, a supporting surface at one side, and a clamping surface at an opposite side, the valve assembly comprising:
   a riding member having at least one pivot arm adapted to be extended and retracted *along a horizontal axis*, said riding member adapted to be inserted through said opening when said pivot arm is in a retracted position;
   a valve body adapted to be positioned on said supporting surface;
   a threaded actuating member extending through a portion of said valve body for actuation from a position on said supporting surface at said one side and also threadably engaging said riding member; and
   a guide member connected to said valve body and extendable through the support wall such that the riding member is operatively guided by said guide member;
   whereby rotation of said threaded actuating member can effect movement of said riding member toward said clamping surface and engagement of said pivot arm in an extended and blocking position that can restrict movement of said riding member through the supporting surface.

5. [The valve assembly of claim 4, wherein there is included] *A valve assembly for mounting on a support, the support having a wall with an opening, a supporting surface at one side, and a clamping surface at an opposite side, the valve assembly comprising:*
   *a riding member having at least one pivot arm adapted to be extended and retracted, said riding member adapted to be inserted through said opening when said pivot arm is in a retracted position;*
   *a valve body adapted to be positioned on said supporting surface;*
   *a threaded actuating member extending through a portion of said valve body for actuation from a position on said supporting surface at said one side and also threadably engaging said riding member;*
   *a guide member connected to said valve body and extendable through the support wall such that the riding member is operatively guided by said guide member, said riding member and said threaded actuating member constructed and arranged to permit disengagement of said riding member from said guide member by reverse rotation of said threaded actuating member; and*
   a deflector member operatively connected to said guide member to assist in disengagement of said riding member;
   *whereby rotation of said threaded actuating member can effect movement of said riding member toward said clamping surface and engagement of said pivot arm in an extended and blocking position that can restrict movement of said riding member through the supporting surface.*

* * * * *